United States Patent
Duffield et al.

(10) Patent No.: US 7,080,136 B2
(45) Date of Patent: Jul. 18, 2006

(54) METHOD AND APPARATUS FOR SIZE-DEPENDENT SAMPLING FOR MANAGING A DATA NETWORK

(75) Inventors: Nicholas G. Duffield, New York, NY (US); Carsten Lund, Berkeley Heights, NJ (US); Mikkel Thorup, Florence, MA (US)

(73) Assignee: AT & T Corp., Bedminster, NJ (US)

( * ) Notice: Subject to any disclaimer, the term of this patent is extended or adjusted under 35 U.S.C. 154(b) by 649 days.

(21) Appl. No.: 10/056,683

(22) Filed: Jan. 24, 2002

(65) Prior Publication Data

US 2002/0165958 A1 Nov. 7, 2002

Related U.S. Application Data

(60) Provisional application No. 60/300,587, filed on Jun. 22, 2001, provisional application No. 60/277,123, filed on Mar. 18, 2001.

(51) Int. Cl.
*F06F 15/16* (2006.01)

(52) U.S. Cl. .................................................. 709/223
(58) Field of Classification Search .................. 709/223
See application file for complete search history.

(56) References Cited

U.S. PATENT DOCUMENTS

| | | | | |
|---|---|---|---|---|
| 5,197,002 | A * | 3/1993 | Spencer | 705/34 |
| 6,330,008 | B1 * | 12/2001 | Razdow et al. | 715/772 |
| 6,725,263 | B1 * | 4/2004 | Torres | 709/223 |
| 6,823,225 | B1 * | 11/2004 | Sass | 700/94 |

OTHER PUBLICATIONS

Claffy, Kimberly C., et al., "Application of Sampling Methodologies to Network Traffic Characterization," *Association for Computing Machinery* SIGCOMM '93, Sep. 1993, vol. 9, pp. 194-203.

* cited by examiner

*Primary Examiner*—David Y. Eng

(57) ABSTRACT

The present invention provides a method and apparatus for sampling data flows in a data network in order to estimate a total data volume in the network. Sampling the data flows In the data network reduces the network resources that must be expended by the network to support the associated activity. The present Invention enables the service provider of the data network to control sampled volumes in relation to the desired accuracy. The control can be either static or can be dynamic for cases in which the data volumes are changing as a function of time.

44 Claims, 13 Drawing Sheets

METHOD AND APPARATUS FOR SIZE-DEPENDENT SAMPLING FOR MANAGING A DATA NETWORK

This application claims priority to provisional U.S. Application No. 60/277,123 ("Control Of Volume And Variance In Network Management"), filed Mar. 18, 2001 and provisional U.S. Application No. 60/300,587 ("Charging from Sampled Network Usage"), filed Jun. 22, 2001.

FIELD OF THE INVENTION

The present invention provides apparatus for sampling data flows in a data network.

BACKGROUND OF THE INVENTION

Service providers of data networks are increasingly employing usage measurements as a component in customer charges. One motivation stems from the coarse granularity in the available sizes of access ports into the network. For example, in the sequence of optical carrier transmission facilities OC-3 to OC-12 to OC-48 to OC-192, each port has a factor 4 greater capacity than the next smallest. Consider a customer charged only according to the access port size. If customer's demand is at the upper end of the capacity of its current port, the customer will experience a sharp increase in charges on moving to the next size up. Moreover, much of the additional resources will not be used, at least initially. Usage based charging can avoid such sharp increases by charging customers for the bandwidth resources that they consume. Another motivation for usage-based charging stems from the fact that in IP networks the bandwidth beyond the access point is typically a shared resource. Customers who are aware of the charges incurred by bandwidth usage have a greater incentive to moderate that usage. Thus, charging can act as a feedback mechanism that discourages customers from attempting to fill the network with their own traffic to the detriment of other customers. Finally, differentiated service quality requires correspondingly differentiated charges. In particular, it is expected that premium services will be charged on a per use basis, even if best effort services remain on a flat (i.e. usage insensitive) fee.

In order to manage a date network, the service provider typically determines customer usage at routers and other network elements in order to properly bill the customer. One approach is to maintain byte or packet counters at a customer's access port(s). Such counters are currently very coarsely grained, giving aggregate counts in each direction across an interface over periods of a few minutes. However, even separate counters differentiated by service quality would not suffice for all charging schemes. This is because service quality may not be the sole determinant of customer charges. These could also depend, for example, on the remote (i.e. non-customer) IP address involved. This illustrates a broader point that the determinants of a charging scheme may be both numerous and also relatively dynamic. This observation may preclude using counts arising from a set of traffic filters, due to the requirement to have potentially a large number of such filters, and the administrative cost of configuring or reconfiguring such filters.

A complementary approach is to measure (or at least summarize) all traffic, and then transmit the measurements to a back-office system for interpretation according to the charging policy. In principle, this could be done by gathering packet headers, or by forming flow statistics. An IP flow is a sequence of IP packets that shares a common property, as source or destination IP address or port number or combinations thereof. A flow may be terminated by a timeout criterion, so that the interpacket time within the flow does not exceed some threshold, or a protocol-based criterion, e.g., by TCP FIN packet. Flow collection schemes have been developed in research environments and have been the subject of standardization efforts. Cisco NetFlow is an operating system feature for the collection and export of flow statistics. These include the identifying property of the flow, its start and end time, the number of packets in the flow, and the total number of bytes of all packets in the flow.

The service provider of a data network also typically collects data regarding data usage over the data network as well as parts of the data network. The collection of network usage data is essential for the engineering and management of communications networks. Until recently, the usage data provided by network elements has been coarse-grained, typically comprising aggregate byte and packet counts in each direction at a given interface, aggregated over time windows of a few minutes. However, these data are no longer sufficient to engineer and manage networks that are moving beyond the undifferentiated service model of the best-effort Internet. Network operators need more finely differentiated information on the usage of their network. Examples of such information include (i) the relative volumes of traffic using different protocols or applications; (ii) traffic matrices, i.e., the volumes of traffic originating from and/or destined to given ranges of Internet Protocol (IP) addresses or Autonomous Systems (AS); (iii) the time series of packet arrivals together with their IP headers; (iv) the durations of dial-user sessions at modem banks. Such information can be used to support traffic engineering, network planning, peering policy, customer acquisition, marketing and network security. An important application of traffic matrix estimation is to efficiently redirect traffic from overloaded links. Using this to tune OSPF/IS-IS routing one can typically accommodate 50% more demand.

Concomitant with the increase in detail in the information to be gathered is an increase in its traffic volume. This is most noticeable for traffic data gathered passively, either by packet monitors gathering IP packet header traces or IP flow statistics. As an example, a single OC-48 at full utilization may yield as much as 70 GB of IP packet headers or 3 GB of flow statistics per hour. The volume of data exported for further analysis may be potentially decreased at the measurement point through either filtering or aggregation. Neither of these approaches may be appropriate for all purposes. Filtering allows us to restrict attention to a particular subset of data, e.g., all traffic to or from a pre-determined range of IP addresses of interest. However, not all questions can be answered in such a manner. For example, in determining the most popular destination web site for traffic on a given link, one generally does not know in advance which address or address ranges to look for. On the other hand, aggregation and other forms of analysis at the measurement site have two disadvantages. First, the time-scale to implement and modify such features in network elements are very long, typically a small number of years. Second, the absence of raw measured data would limit exploratory studies of network traffic.

With increasing data usage that is driven for the explosive demand for data services, a data network must support greater data traffic. Consequently, the data network must generate more data and associated messaging for managing the data network. A method that ameliorates the generation of management-related messaging and data while preserving the capabilities of managing the data network is therefore of great benefit to the industry.

BRIEF SUMMARY OF THE INVENTION

The present invention provides apparatus for sampling data flows in a data network in order to estimate a total data volume in the data network. Sampling the data flows in the data network reduces the network resources that must be expended by the network in order to support the associated activities. The present invention enables the service provider of the data network to control sampling volumes in relation to the desired accuracy. (In the disclosure "sampling volume" is defined as a number of objects selected as the result of sampling, e.g. during a sampling window. It may be a pure number, or may be expressed as a rate, i.e. number of objects per unit time.) The control can be either static or can be dynamic for cases in which the data volumes are changing as a function of time. Moreover, the present invention is not dependent upon the underlying statistical characteristics of the data flows.

The disclosure presents an exemplary embodiment with two variations. The exemplary embodiment comprises a data network with a network of routers and dedicated hosts for managing the data network. The first variation enables the service provider to charge a customer for usage of a data network. The method utilizes the sampling of flows that are associated with the customer. The contribution to the usage by a sampled flow is normalized by a number that reflects the probability of sampling. The usage can be adjusted by the service provider in order to compensate for a possibility of overcharging. In addition, the method enables the service provider to adjust the sampling rate and the billing period to reduce undercharging in accordance with the goals of the service provider. The second variation enables the service provider to manage a data network in accordance with the measured traffic volume. The service provider can adjust the sampling volume in accordance with the measured sampling volume and with the desired accuracy for both static and dynamic situations.

DETAILED DESCRIPTION OF THE INVENTION

One limitation to comprehensive direct measurement of traffic stems from the immense amounts of measurement data generated. For example, a single optical carrier transmission facility OC-48 at full utilization could generate about 100 GB of packet headers, or several GB of (raw) flow statistics each hour. The demands on computational resources at the measurement point, transmission bandwidth for measured data, and back-end systems for storage and analysis of data, all increase costs for the service provider.

A common approach to dealing with large data volumes is to sample. A common objection to sampling has been the potential for inaccuracy; customers can be expected to be resistant to being overcharged due to overestimation of the resources that they use.

Figure 1:
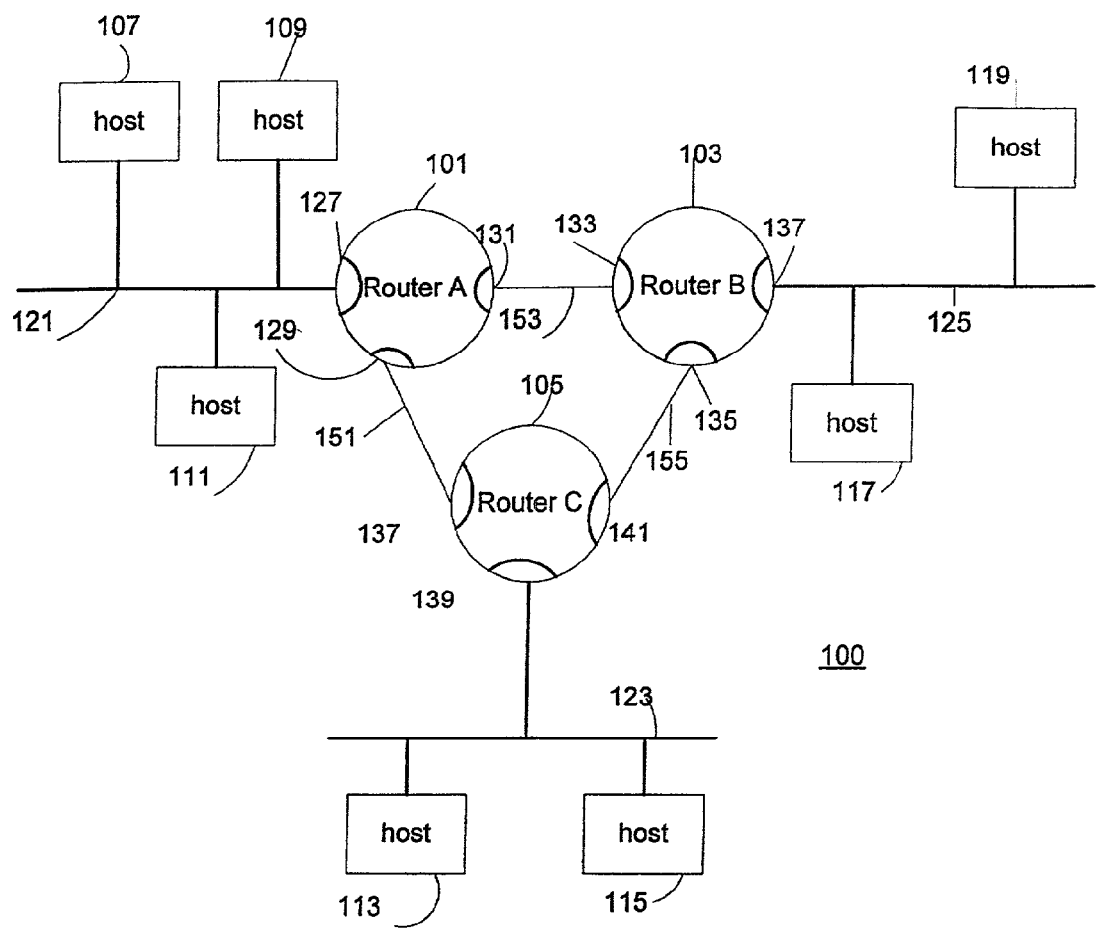
FIG. 1 illustrates a data network utilizing size-dependent sampling, in accordance with the present invention.

FIG. 1 illustrates data network 100 that utilizes size-dependent sampling in accordance with the present invention. In the exemplary embodiment of the invention, data network 100 supports Internet Protocol (IP) messaging for the users (customers) of host 107, 109, 111, 113, 115, 117, and 119. (However, variations of the embodiment can support other data protocols.) A host includes PCs, workstations, mainframes, file servers, and other types of computers. Hosts 107, 109, and 111 are configured on data link 121; hosts 113 and 115 are on data link 123; and hosts 117 and 119 are configured on data link 125. In order for a host (e.g. host 111) to communicate to another host (e.g. host 119) on a different data link, IP messaging is routed through routers 101, 103, and 105 and data links 151, 153, and 155. A router forwards packets between hosts and other routers in order to enable hosts not connected to the same link to communicate. Each router has a port (e.g. 127, 129, and 131 for router 101 that connects to a data link. Similarly, ports 133, 135, and 137 correspond to router 103, and ports 137, 139, and 141 correspond to router 105.

In the exemplary embodiment, host 113 supports the billing (charging) of customers and host 115 supports the collection and the utilization of data traffic information regarding data transmission for data network 100. Hosts 107, 109, 111, 117, and 119 correspond to users who are the customers for the service provider operating data network 100. Managing functions that are associated with the billing of customers and the traffic management support the collection of relevant information for the management of data network 100. (In the disclosure, "managing a network" denotes the determination of one or more characteristics of the configuration, state, and/or usage of the network and its management subsystems. The characteristics are then reported for subsequent activities such as billing or marketing, and/or using them to assist reconfigure and/or reengineer the network and its management subsystems.) Host 113 collects information from routers 101, 103, and 105 about customer usage. Host 115 collects information about data traffic over the data links. With a typical data network, many flows are transported over the data network. Generating management-related messages to hosts 113 and 115 can be very detrimental to the performance of data network 100 if the number of messages is large. Thus, sampling is supported by data network 100 in order to reduce the number of management-related messages to reduce any associated performance degradations.

With alternative embodiments, a router (e.g. 101, 103, and 105) collects information about data traffic over data links through the router. Utilizing the information, the router can adjust its configuration for the current data traffic.

The present invention provides a sampling mechanism that specifically addresses concerns of sampling error. Total customer usage is the sum of a number of components, some large, some small. Sampling errors arise predominantly from omission of the larger components, whereas accuracy is less sensitive to omission of the smaller components. For example, consider a simple sampling scheme in which one estimates the total bytes of usage by sampling 1 in every N flows, and then adds together N times the total bytes reported in each sampled flow. The underlying distribution of flow bytes sizes has been found to follow a heavy tailed distribution. In this case, the estimate can be extremely sensitive to the omission or inclusion of the larger flows. Generally, such an estimator can have high variance due to the sampling procedure itself. (In the disclosure, the term "flow" is used synonymously with the term "object.")

The present invention does not require any knowledge of the underlying statistical information of the data traffic for data network 100. For example, the associated probability relating to the size of a flow can assume any form, including a heavy-tailed probability distribution. A flow (object) comprises at least one unit of data (e.g. packet, byte, octet, and ATM cell).

Additionally, the present invention reduces sampling volumes for data network 100. A heavy-tailed distribution of flow sizes can be turned to an advantage for sampling provided an appropriate sampling algorithm is used. The present invention utilizes size-dependent sampling, in which an object of size x is selected with some size dependent probability $p(x)$. The probability $p(x)$ is 1 for large x. In the case of flows, all sufficiently large flows will always be selected; there is no sampling error for such flows. On the other hand one can have $p(x)<1$ for smaller flows; this reduces the number of samples, but the error involved is small since the underlying flows are small. To estimate the total bytes represented in the original set of flows, one sums the quantities $x/p(x)$ over only the sampled flows. Applying the renormalization factor $1/p(x)$ to the small flows compensates for the fact that that might have been omitted. In fact, it can be shown that this sum is an unbiased estimator of the actual total bytes (i.e. its average value over all possible random samplings is equal to the actual total bytes. Moreover, uniform sampling is a special case of this scheme with $p(x)$ constant and equal to $1/N$.)

With the exemplary embodiment of the invention (as shown as data network 100 in FIG. 1), routers 101, 103, and 105 sample objects (flows). Consequently, routers 101, 103, and 105 send messages ("samples") to host 113 (corresponding to charging the customer for usage) and to host 115 (corresponding to determining traffic volume) comprising attributes of the sampled object (e.g. the customer's identification) and the size of the object. Alternative embodiments may store corresponding data at routers 101, 103, and 105 for later processing or may utilize intervening processors between routers 101, 103, and 105.

Size-dependent sampling has a number of advantages. First, the sampling probabilities $p(x)$ can be chosen to satisfy a certain optimality criterion for estimator variance as described later. Second, a simple adaptive scheme allows dynamic tuning of $p(x)$ in order to keep the total number of samples within a given bound. Thus, in the context of flow measurement, the number of flow statistics that are transmitted to the back-end system (host 113 and host 115) can be controlled by the service provider. Third, on binding the sampling parameters (i.e. $p(x)$) to the data x in constructing the rescaled size $x/p(x)$, the need to keep independent track of $p(x)$ (or even the original flow sizes x) is obviated. Thus, $p(x)$ can vary at different times and across different regions of the network (as needed), but estimation remains unbiased. Fourth, sampling is composable in the sense that the first three properties above are preserved under successive resampling. Thus, one could progressively resample at different points in the measurement system in order to limit sample volumes. Also, size-dependent sampling is applicable to packet sampling as well. However, one expects the performance benefit over 1 in N sampling to be smaller in this case, since packet sizes do not have a heavy-tailed distribution.

The present invention utilizes an approach to usage-sensitive charging that mirrors the foregoing approach to sampling. The sampling scheme determines the size of the larger flows with no error. Estimation error arises entirely from sampling smaller flows. For billing purposes we wish to measure the total bytes for each billed entity (e.g. for each customer at a given service level) over each billing cycle. Larger totals have a smaller associated sampling error, whereas estimation of total bytes for the smallest customers may be subject to greater error. Therefore, the service provider sets a level L on the total bytes, with a fixed charge for all usage up to L, then a usage sensitive charge for all usage above L. Thus, the service provider only needs to tune the sampling scheme for estimating the usage above L within the desired accuracy.

Moreover, the potentially massive volumes of data to be gathered have important consequences for resource usage at each stage in the chain leading from data collection to data analysis. First, computational resources on network elements are scarce, and hence measurement functions may need to be de-prioritized in favor of basic packet forwarding and routing operations, particularly under heavy loads. Second, the transmission of raw measurement data to collection points can consume significant amounts of network bandwidth. Third, sophisticated and costly computing platforms are required for the storage and analysis of large volume of raw measurement data.

The present invention utilizes sampling as a means to reduce data volume while at the same time obtaining a representative view of the raw data. An elementary way to do this is to sample 1 in N raw data objects, either independently (i.e. each object is selected independently with probability $1/N$) or deterministically (objects N, 2N, 3N, ... are selected and all others are discarded). Only those selected objects are used further for analysis. This sampling strategy clearly reduces the load associated with the subsequent transmission, storage, and analysis of the data by a factor N.

However, besides the ability to reduce data volumes, the statistical properties of any proposed sampling scheme must be evaluated. The sampling parameters (N in the above example) need to be bounded to the sampled data in order that extensive properties of the original data stream can be estimated. For example, to estimate the bytes rate in a raw packet stream from samples gathered through 1 in N sampling, one needs to multiply the byte rate of the sampled stream by N. Under a given constraint on resources available for measurement transmission or processing of data, N may vary both temporally and spatially according to traffic volumes. Hence, N is not typically a global variable independent of the raw data.

Although one expects random sampling to yield unbiased estimates of properties of the typical raw data objects, there may be a significant impact of the variance of such estimates. A striking feature of flow statistics is that the distributions of the number of packet and bytes in flows are heavy-tailed. Consider the problem of reducing reported flow export volumes by sampling 1 in every N flow statistics. Sampling from heavy tailed distributions is particularly problematic, since the inclusion or exclusion of a small number of data points can lead to large changes in estimates of the mean. This has the consequence that estimates of the total byte rates on a link using a subset of flows selected by 1 in N sampling can be subject to high variance due to the sampling procedure itself. A sampling strategy that samples all big flows and a sufficient fraction of the smaller flows may reduce the estimator variance.

The basis of the sampling scheme is that sufficiently large objects (that may comprise packets or asynchronous transfer mode cells) are always sampled, while smaller objects are sampled with progressively smaller probability. A set of objects (flows) are labeled by i=1, 2, ..., n corresponding to summaries generated by measurements in the network during some time period. Let $x_i$ be the size attribute of interest from the flow i, e.g., the number of packets in the flow, or the total number of bytes in the flow, or any other positive quantity of interest. Each packet in a flow possesses a common attribute, such as IP address (or net), port number, or Type of Service (ToS) field. Each combination of interest corresponds to attributes as referred by a "color"; $c_i$ will be the color of flow i. In the context of billing, a color might correspond to a customer address, or this plus a remote network, and possibly a ToS specification. The mapping that associates a particular customer with a set of packet attributes may be relatively complex;. This to be performed by the subsystem that collects and interprets the measurements (e.g. hosts 113 and 115 in the exemplary embodiment). The objective is to estimate the totals for each color c of interest as follows.

$$X(c) = \sum_c x_i \quad (1)$$

The present invention supports the sampling of raw packet headers, the set of flow statistics formed from the sampled packets, the stream of flow statistics at some intermediate aggregation point, and the set of aggregate flows at the collection point. The knowledge of the number n of original objects in not required. Furthermore, sampling itself need not make reference to the object color c. This reflects the fact that the colors of interest may not be known at the time of sampling and that it is infeasible to simply accumulate sizes from the original stream for all possible colors.

Figure 2:
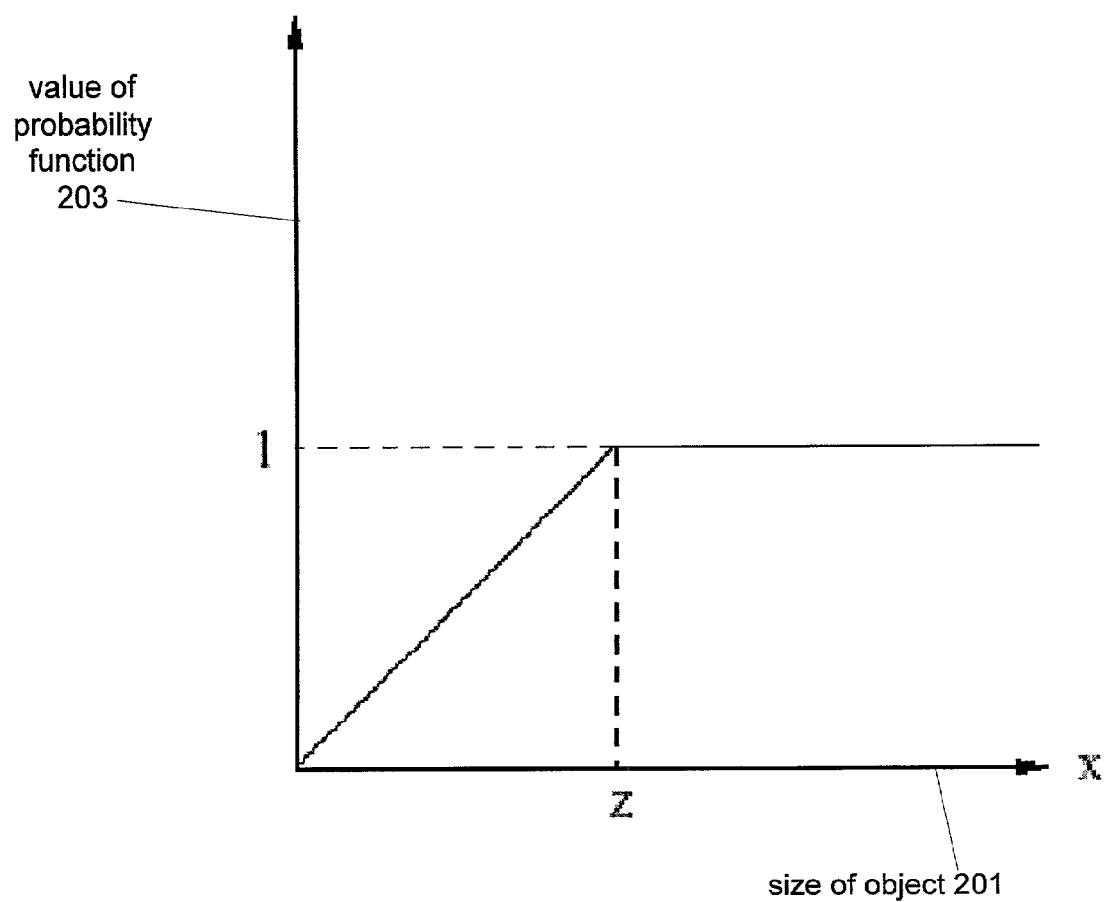
FIG. 2 shows a sampling probability function.

For each positive number z, one defines the sampling probability function $p_z(x)=\min\{1,x/z\}$. In the sampling scheme, a flow with size x is sampled with probability $p_z(x)$. The parameter z acts as a threshold: flow of size z or above are always sampled as shown in FIG. 2. The horizontal axis corresponds to $x_i$ (the size of an object 201). (In the disclosure, the parameter z is an example of a "probabilistic parameter.") Each independent random variable $w_i$ has the values 1 with probability $p_z(x_i)$ and 0 otherwise. Thus $w_i$ indicates whether flow i is to be sampled ($w_i=1$) or not ($w_i=0$). Each sampled value $x_1$ is renormalized by division by $p_z(x_i)$. Thus, the estimate of the X(c) is given by:

$$\hat{X}(c) = \sum_c w_i x_i / p_z(x_i) \quad (2)$$

In order to manage data network 100, the statistical variability of the estimate of X(c) provides a measure of confidence of the estimate. Moreover, the present invention enables the service provider to "tune" the operation of data network 100 in order to achieve the desired accuracy. In fact, $p_z(x_i)$ is optimal in the sense that Var $\hat{X}(c)+z^2 E(N(c))$ is minimized with $p_z(x_i)$, where E(N(c)) is the expected value of N(c). As will be explained later, the disclosure provides a method for controlling the statistical variance based upon operating parameters that the service provider can control. Parameter z is the size threshold above which flows are always sampled. The larger the value of z, the less likely that a given flow will be sampled and consequently the greater the variance associated with sampling it. If z is small, then Var $\hat{X}(c)+z^2 E(N(c))$ is more easily minimized by making Var $\hat{X}(c)$ small, which occurs if one samples more of the flows. Conversely, if z is large, then Var $\hat{X}(c)+z^2 E(N(c))$ is more easily minimized by making E(N(c)) small, which occurs if one samples less of the flows.

Figure 3:
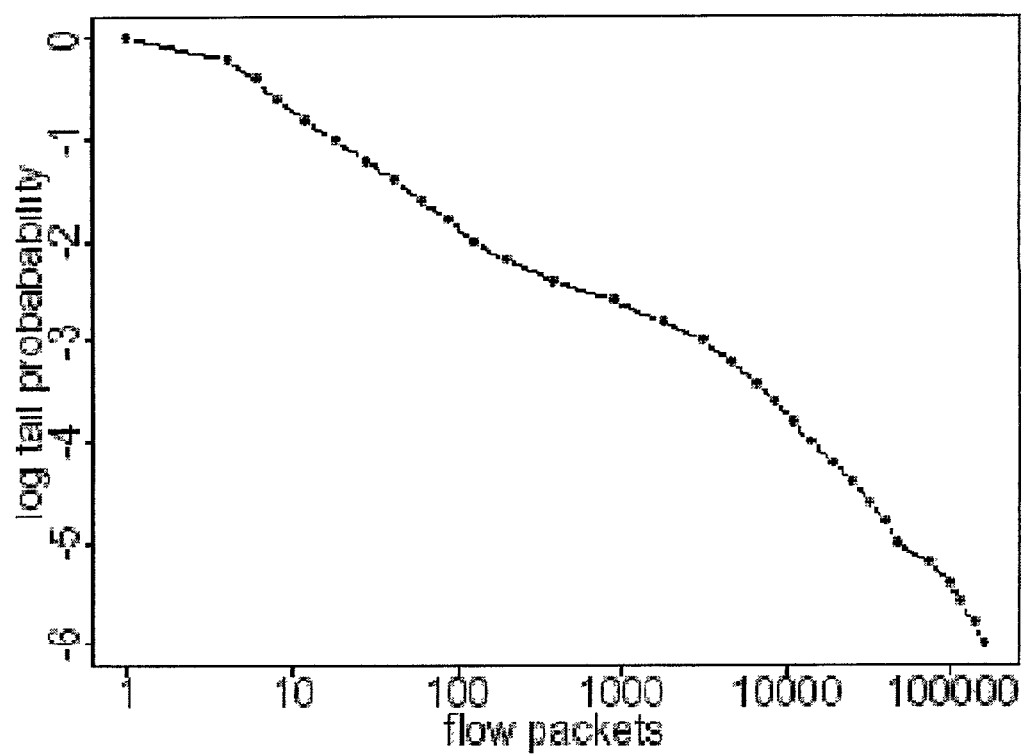
FIG. 3 shows a complementary cumulative distribution (CCDF) of flow byte sizes.
Figure 4:
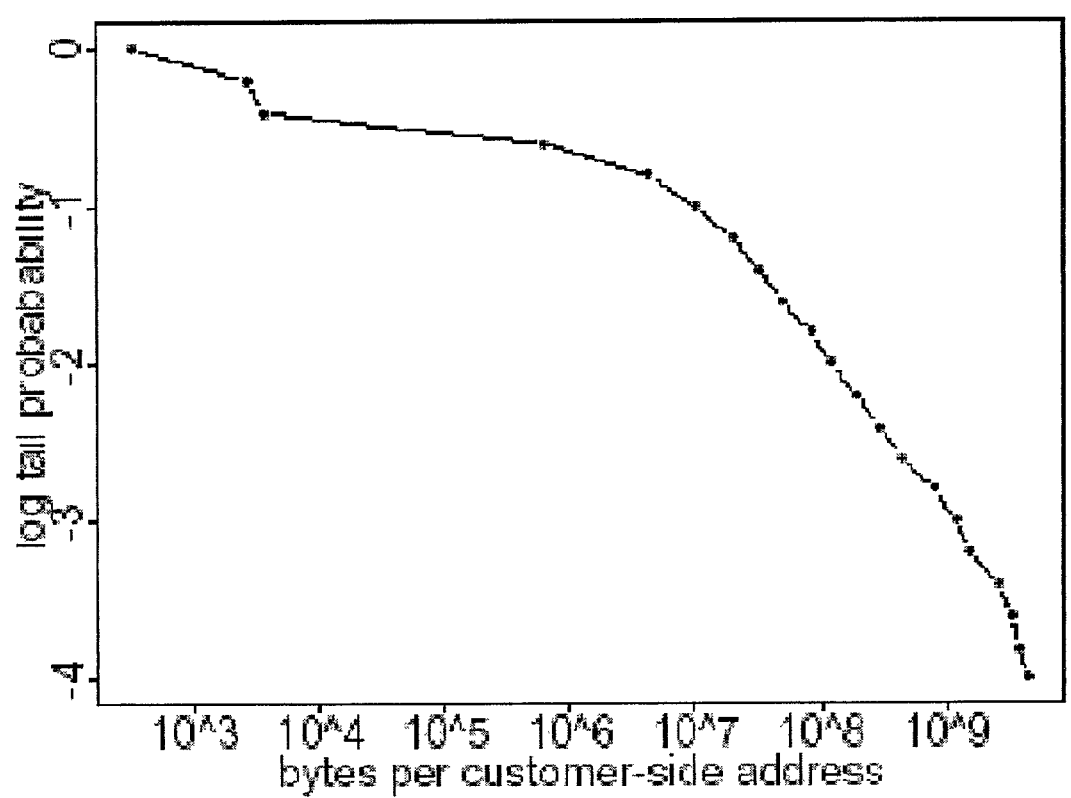
FIG. 4 shows a complementary cumulative distribution (CCDF) of bytes per customer-side IP addresses.

Data networks supporting IP (as in data network 100) typically encounter heavy-tailed distributions of byte and packet sizes of IP. FIG. 3 displays an exemplary complementary cumulative distribution function (CCDF), i.e. the proportion of flows with bytes greater than a given level, of the flow sizes encountered by data network 100. The approximate linearity on the log-log scale is indicative of a heavy tailed distribution. The distribution of total bytes per customer-side IP address over a given period shares the heavy tailed property as shown in FIG. 4.

A statistic for comparing estimated usage with its actual usage is quantified by the Weighted Mean Relative Error (WMRE).

$$WMRE = \frac{\sum_c |\hat{X}(c) - X(c)|}{\sum_c X(c)} \quad (3)$$

The WMRE averages the per-color absolute relative errors. WMRE gives greater weight to relative errors for large volume colors than for those with small volumes.

Figure 5:
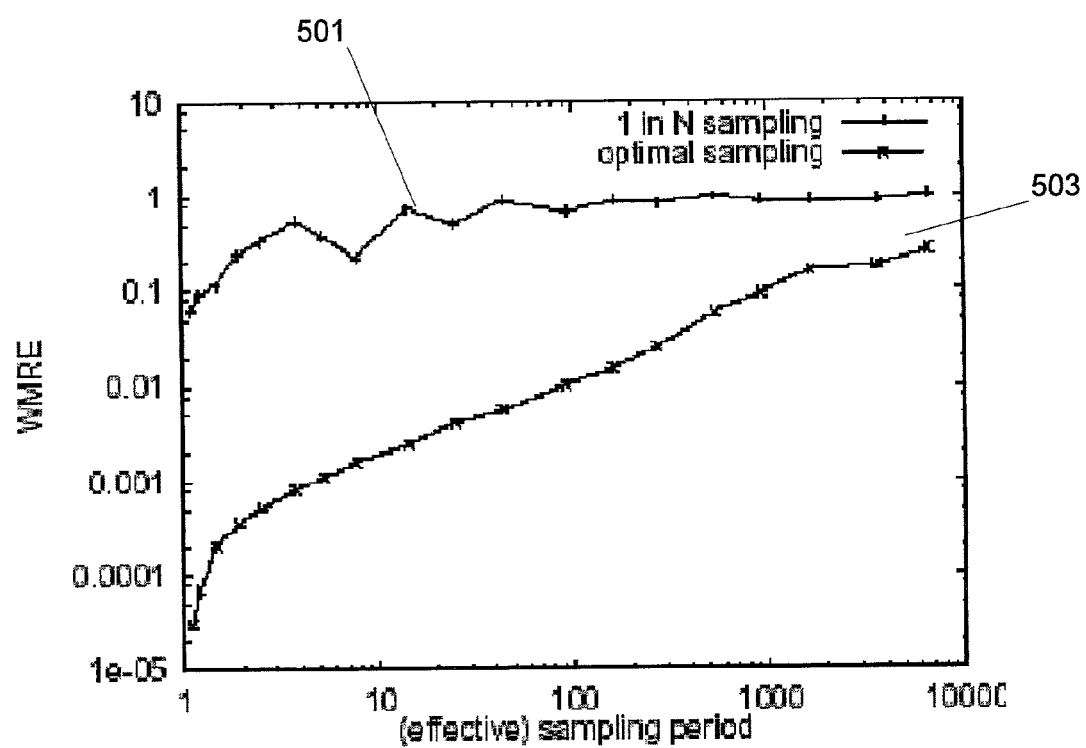
FIG. 5 shows an example of weighted mean relative error vs. an effective sampling period.

FIG. 5 illustrates an example of substantially better accuracy (smaller WMRE) of optimal sampling as compared with 1 in N sampling, over 4 orders of magnitude of the sampling period. Curve 501 illustrates the relationship for WMRE as a function of the effective sampling period, while curve 503 shows the corresponding relationship with sampling as described in the disclosure. With an effective sampling period of 100, the WMRE for optimal sampling is about only 1%, while for 1 in N sampling it is around 50%. The irregularity of the upper line reflects the sensitivity of the estimates from 1 in N sampling to random inclusion or exclusion of the largest flows during sampling. These features demonstrate the potential for inaccuracy arising from naive sampling from heavy-tailed distributions.

Figure 6:
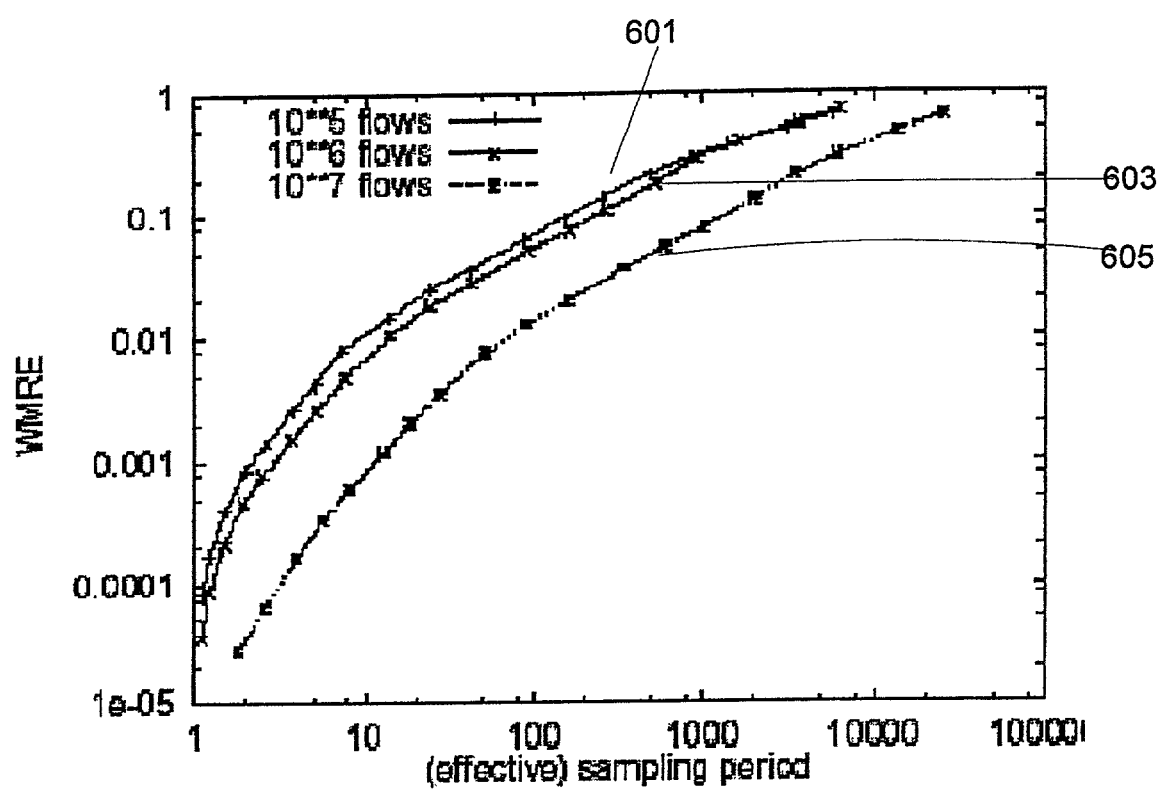
FIG. 6 shows an example of weighted mean relative error vs. an effective sampling period for different flow sizes.

FIG. 6 displays with WMRE vs. sampling period for a trace of $10^7$ flows (corresponding to curve 605), as compared with subportions contain $10^6$ (corresponding to curve 603) and $10^5$ (corresponding to curve 601) flows. The relative error decrease as the trace length increases, since the byte total for a given IP address is composed of a greater number of contributions. It may be desirable to place lower bounds on z in order to fulfill other objectives, such as limiting the rate at which samples are generated. The behavior from FIG. 6 suggests that is possible to simultaneously fulfill the goal of low relative error provided that the length of the period of observation (e.g. the billing period) is sufficiently long.

The exemplary embodiment utilizes the disclosed sampling techniques for charging the customer of data network 100 for usage. Fair charging requires that the deviation between the traffic charged to a customer and the actual traffic be kept to a minimum. The scheme is essentially the best possible, in the sense that variance of $\hat{X}$ is minimized for a given threshold z. However, the relative estimation error can be relatively large for colors with small amounts of traffic. As an extreme example, suppose the traffic associated with color c has total size $X(c)<z$. Each flow in that traffic thus has size less than z and will hence have a contribution to the estimate $\hat{X}(c)$ that is either 0 (if the flow is not sampled), or z (if it is sampled, wherein the sample is normalized by $p_z(x)$). Hence, $\hat{X}(c)$ will be either 0, or at least z.

As a simple solution to the problem of estimating the small traffic volumes, the service provider can charge the traffic of a given color at a fixed fee, plus a usage-sensitive charge only for traffic volumes that exceed a certain level L. (L may depend on the color in question). The idea is to tune the sampling algorithms so that any usage X(c) that exceeds L can be reliably estimated. Usage X(c) that falls below L does not need to be reliably estimated, since the associated charge is usage-insensitive, i.e., independent of $\hat{X}(c)<L$.

Generally, one can consider traffic to be charged according to some function $f_c(\hat{X}(c))$ which depends on $\hat{X}(c)$ only through the quantity $\max\{\hat{X}(c), L\}$, i.e., it is independent of any usage below L. The subscript of $f_c$ indicates that the charge may depend on the color c, e.g., through the type of service, or foreign IP address. In the exemplary embodiment, the service charges the customer according to:

$$f_c(\hat{X}(c))=a_c+b_c \max\{\hat{X}(c), L\} \quad (4)$$

where "$a_c$" is a fixed charge, than can encompass, e.g., port charges and administrative charges, "$b_c$" is a per byte charge on traffic transmitted during the billing cycle, and "L" is the minimum usage. Equation 4 can also express pricing models in which there is a fixed administrative charge for small customers, whose usage doesn't warrant accurate measurement. Both $a_c$ and $b_c$ are allowed to depend on the color c in question.

Reliable estimation of the volumes X(c) is determined by choosing the sampling threshold z appropriately high for level L in question. The larger the level L and the larger the deviation of $\hat{X}(c)$ from X(c) that can be tolerated, the higher a sampling level z one can allow.

The variance of all estimates for $\hat{X}(c)$ greater than the level L can be controlled. This corresponds as a condition on the standard error, i.e., the ratio of standard deviation $\sigma(\hat{X}(c))$=sqrt(Var $\hat{X}(c)$) to the mean X(c). In the exemplary embodiment, the typical estimation error is no more than about $\epsilon$ times X, for some target $\epsilon>0$. This can be expressed this as the following standard error condition:

$$\sigma(\hat{X}(c))<\epsilon X(c) \text{ if } X(c)>L \quad (5)$$

For example, with $\epsilon=0.05$ the standard deviation cannot be more than 5% of the mean.

If $\hat{X}(c)$ is derived from a large number of flows of independent sizes then $\hat{X}(c)$ is roughly normally distributed. From Equation 5, the probability of overestimating $\hat{X}(c)>L$ by an amount $\delta X(c)$ (i.e., by $\delta/\epsilon$ standard deviations) is no more than $\psi(-\delta/\epsilon)$, where $\psi$ is the standard normal distribution function. Thus, with $\epsilon=0.05$, the probability of overestimating $\hat{X}(c)$ by more than 10% (corresponding to $\delta$) is approximately equal to $\psi(-2)=2.23\%$ (since $10\%=2\times5\%$).

The above approach sets limits on the chance that the deviation of the estimated usage above the actual usage exceeds a given amount. A refinement allows the service provider to set a limit on the chance that overcharging occurs. This should be more attractive from the customer's point of view since the chance of the customer being over billed at all can be small. Conversely, the service provider has to accept a small persistent under billing in order to accommodate the potential sampling error.

The distribution of $\hat{X}(c)$ can be well approximated by a normal distribution when it is derived from a large number of constituent samples. If the probability of $\hat{X}(c)$ being at least s standard deviations above the expected value X(c) is sufficiently small, then the calculated usage can be adjusted as follows:

$$\hat{X}'(c)=\hat{X}(c)-s\sqrt{z\hat{X}(c)} \quad (6)$$

"s" is the number of standard deviations away from X(c) above which over-estimation is sufficiently rare. As an example, with s=3, $\psi(-s)$ is about 0.13%, i.e. about 1 in 740 traffic volumes will be overestimated. The service provider may charge according to $\hat{X}'(c)$ rather than $\hat{X}(c)$. In such a case, the customer is billed $f_c(\hat{X}'(c))$. Thus, the chance that the customer is over billed is approximately equal to $\psi(-s)$.

For the service provider, the difference $\hat{X}(c)-\hat{X}'(c)=s\sqrt{z\hat{X}(c)}$ represents unbillable revenue. In the charging scheme (as in Equation 4), this leads to under billing by a fraction roughly $s\sqrt{z/X(c)}$. Given the minimum billed volume L, the fraction of underbilling is no more than $s\sqrt{z/L}$. (In variations of the exemplary embodiment, underbilling can be systematically compensated for in the charging rate $b_c$). Thus, in order to limit potential undercharging to a fraction of no more than about $\eta$, the service provider determines $s^2z<\eta^2L$. In the example of s=3, underbilling by a fraction of no more than $\eta=10\%$ then requires selecting z and L such that z is less than about L/1000.

Table 1 shows the tradeoff of overcharging and unbillable usage.

TABLE 1

TRADE-OFF BETWEEN OVERCHARGING AND UNBILLABLE TRAFFIC

|  | Unbillable usage | overcharged customers |
|---|---|---|
| s = 0 | −.1% | 50% |
| s = 1 | 3.1% | 3% |
| s = 2 | 6.2% | 0 |

Consider flows that present themselves for sampling at a rate $\rho$, in which the flow sizes have a distribution function F, i.e., F(x) is the proportion of flows that have size less than or equal to x. With a sampling threshold z, samples are produced at an average rate $r=\rho\int F(dx)p_z(x)$. Suppose there is a target maximum rate of samples $r^*<\rho$. Then the service provider determines the sampling threshold z such that $\rho\int F(dx)p_z(x)<r^*$. Using the fact that $p_z(x)$ is a decreasing function in z, it can be shown that this observation requires $z\geq z^*$, where $z^*$ is the unique solution z to the equation $\rho\int F(dx)p_z(x)=r^*$.

Let $z_0$ denote the maximum sampling threshold allowed in order to control sampling variance, e.g., $z \le z_0 = \epsilon^2 L$. The goals of controlling sample volume and variance are compatible provided that $z^* <= z_0$, for then any sampling threshold z in the interval $[z^*, z_0]$ has the property of being sufficiently small to yield small sampling variance, and sufficiently large to restrict the average sampling rate no greater than the desired rate $r^*$.

The condition $z^* \le z_0$ can be realized by increasing the length of the billing cycle. The thresholds $z_0$ and $z^*$ control phenomena at different timescales. $z^*$ controls the average rate at which samples are taken. On the other hand, $z_0$ controls the sampling variance of the estimates $\hat{X}(c)$ of total bytes over the billing timescale, potentially over days, weeks, or even months. The level byte L (under which accurate measurements are not needed) can be chosen to increase with the billing timescale. For example, the service provider may choose L to correspond to a particular quartile of the distribution of byte size, so that only a given proportion of the total bytes transmitted on the network are generated by customers whose total usage does not exceed L during the billing cycle. Increasing the length of the billing cycle will increase the corresponding quartile L, and hence also $z_0$ since is proportional to L. Support for this approach is provided by FIG. 6, which shows that the relative error in estimation decreases as the duration of collection of the flow trace increases.

Figure 7:
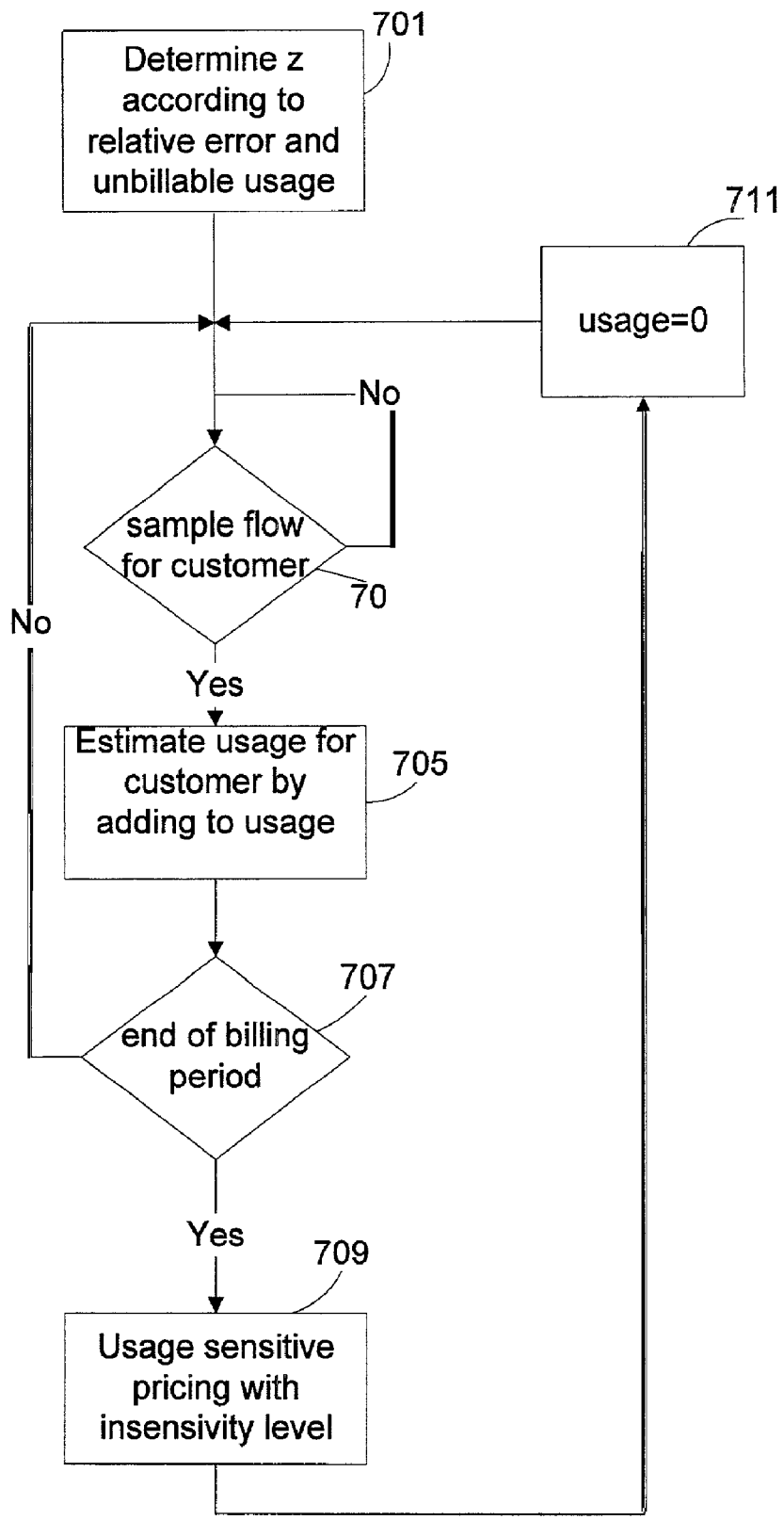
FIG. 7 is a flow diagram for charging with sampled network usage.
Figure 11:
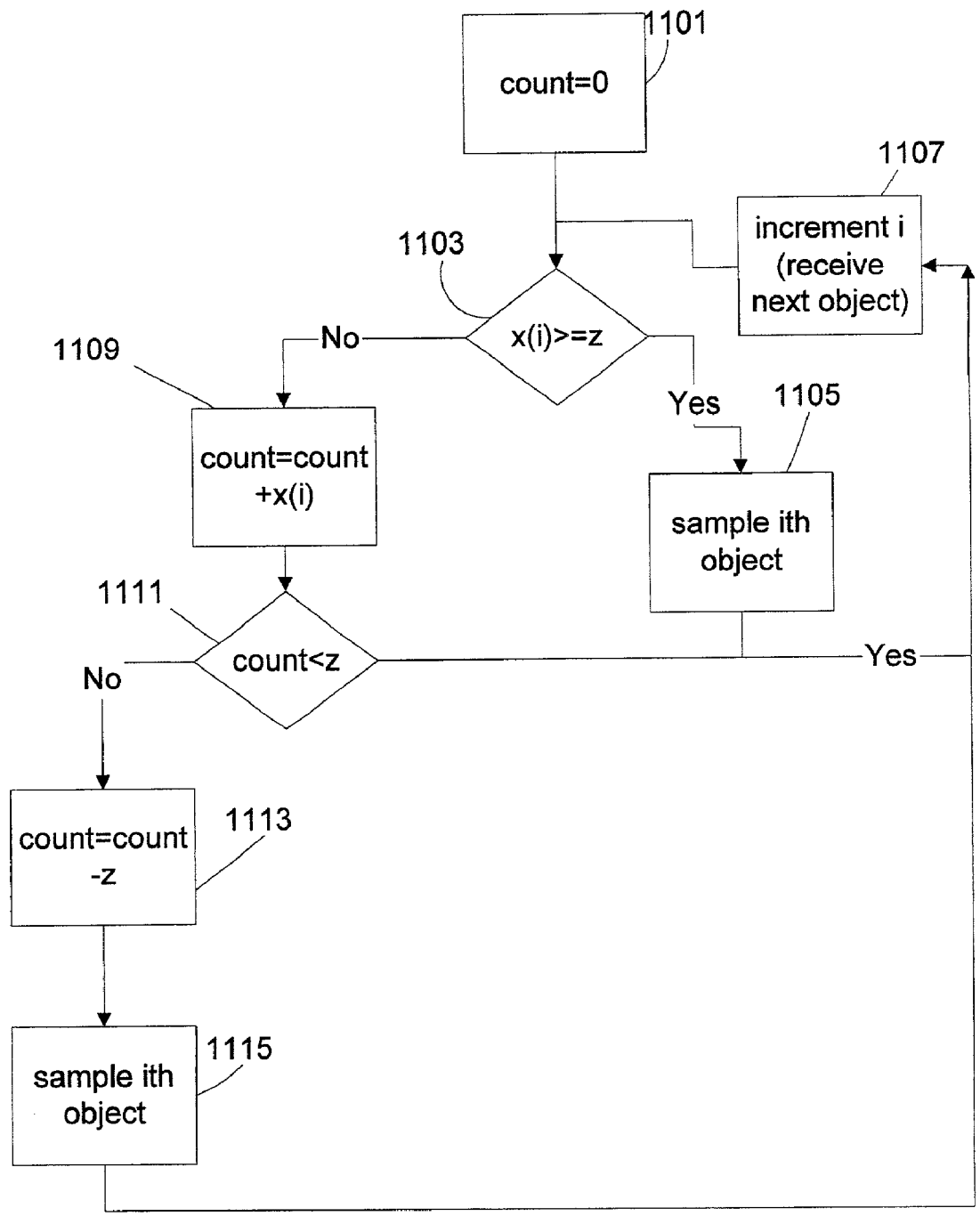
FIG. 11 is a flow diagram for a quasi-random data sampling algorithm.

FIG. 7 is a flow diagram for charging with sampled network usage in accordance with the exemplary embodiment. In step 701, threshold z is determined according to the relative error and the unbillable usage. In step 703, it is determined whether to sample an object that is associated with the customer in accordance with the size of the object and the probabilistic function $p_z(x)$. (The discussion with respect to FIG. 11 presents a method for determining whether to sample the objects based upon the size.) The associated usage is determined from the size of the sampled object by dividing the size by the $p_z(x_i)$ in step 705. At the end of the billing in step 707, the usage sensitive pricing for the customer is calculated in step 709 in accordance with Equation 4 and adjustments by the service provider. In step 711, the usage is reset to 0 so that the usage for the next billing period can be calculated.

The present invention, as disclosed by the exemplary embodiment, also enables the service provider to control the sample volume that is generated by data network 100. Moreover, in data network 100, the amount of data is dynamic with time, and consequently the sampling rate needs to adjust accordingly. In other words, dynamic control of the mean sample volume may be needed.

An object (flow) may be distinguishable by an attribute. (Each object is characterized by a size that may be expressed in a number of packets, bytes (octets), or ATM cells contained in the object. The number is equal to at least one.) In such a case, the object is characterized as being colored. The present invention allows the service provider to estimate the total size of the objects in each color class c. If $c_i$ is the color of packet i, then $$X(c) = \sum_c x_i$$

is the total size of the objects with color c, and the unbiased estimator is then $\hat{X} = \Sigma w_i(r_i)$, in which $\hat{X}(c)$ is obtained simply by summing the sampled normalized sizes of color c. Let $$\hat{X}(c) = \sum_c w_i$$

be the number of sampled objects with color c. By the linearity of expectation, $E(N) = \Sigma(\hat{N}(c))$. Also, since each $x_i$ is picked independently, $\hat{X}(c)$ is independent for each c, and hence $$Var X = \sum_c Var \hat{X}(c).$$

Thus, $$C_z(p) = Var\ \hat{X} + z^2 E(\hat{N}) \quad (7)$$

where p is a probability function that is utilized for determining if an object is to be sampled.

The objective (cost) function $C_z(p)$ is minimized locally over each color class. With variations of the exemplary embodiment, there may be scenarios in which there are different objectives for different colors. However, in the exemplary embodiment, the sampling device does not distinguish colors; however, samples can be later analyzed with respect to any combination of colors.

Finer control of sampling by color, within a given volume constraint, can only increase estimator variance. By applying a different threshold $z_c$ to the sampling of packets for each color, the service provider can control the sampling volume for each color. However, this approach increases the aggregate variance of $\hat{X}(c)$.

In a dynamic context the volume of objects presented for sampling will generally vary with time. Thus, in order to be useful, a mechanism to control the number of samples must be able to adapt to temporal variations in the rate at which objects are offered for sampling. This is already an issue for the 1 in N sampling algorithm, since it may be necessary to adjust N, both between devices and at different times in a single device, in order to control the sampled volumes. For the optimal algorithm, the service provider can control the volume by an appropriate choice of the threshold z. Moreover, one can dynamically adapt (i.e. updating) z knowing only the target and current sample volumes.

Figure 12:
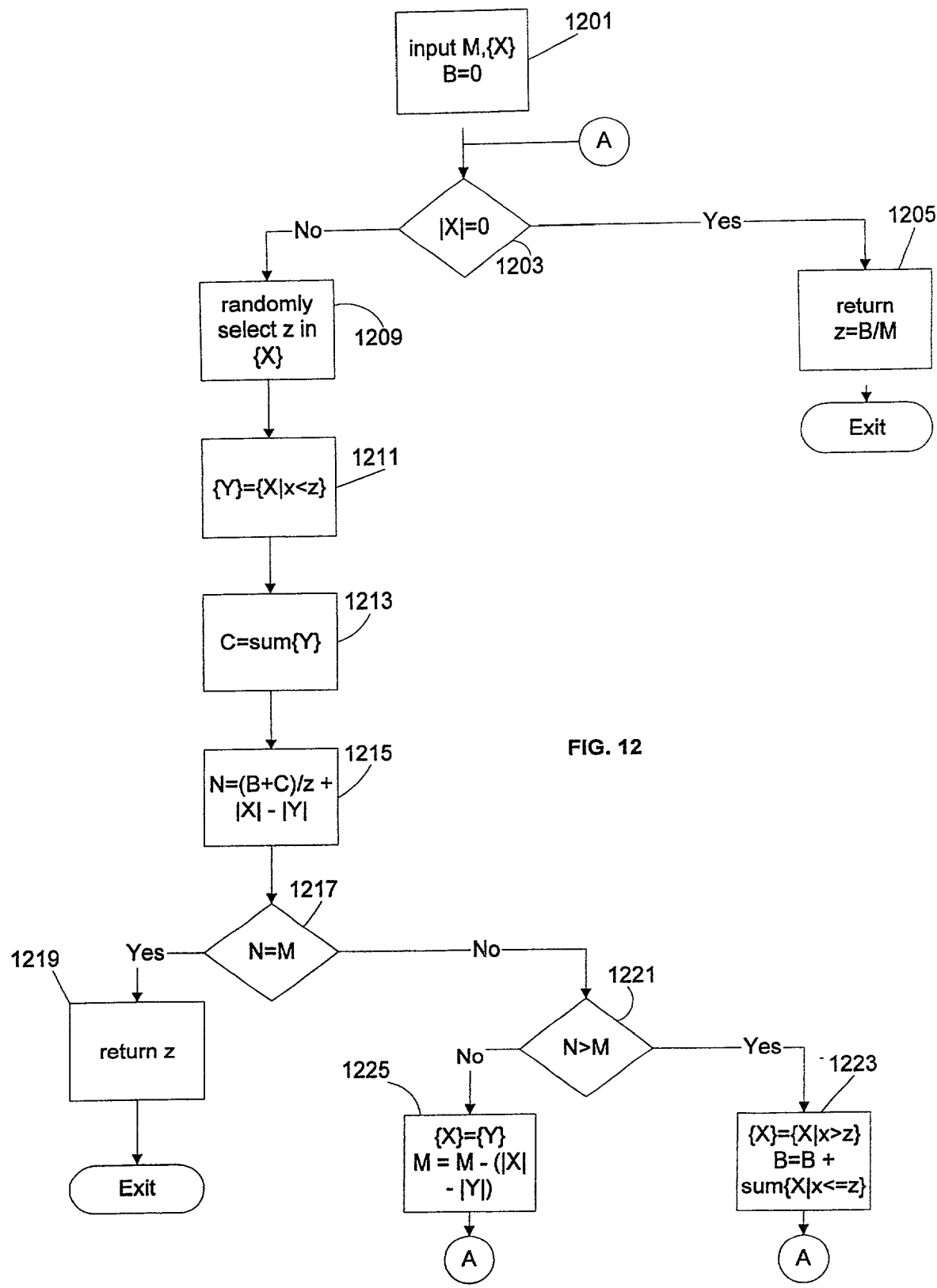
FIG. 12 is a flow diagram for root finding algorithm.

Consider the case in which the targeted sampling volume M is less than n, which is the total number of objects from which to sample.

$$\hat{N}_z = \sum_i w_i$$

is the total number of samples obtained using the sampling function $p_z$. The expected number of samples $$N_z = E(\hat{N}_z) = \sum_i p_z(x_i)$$

is a non-increasing function of z. A direct approach to finding z* is to construct an algorithm to find the root, utilizing a set of $x_i$ (sizes of the sampled objects). FIG. 12, which is discussed later, illustrates the approach utilized in the exemplary embodiment.

Alternatively, the service provider can dynamically adapt (i.e. updating) z knowing only the target and current sample volumes. One approach is update z by:

$$z_{k+1} = z_k \hat{N}/M \qquad (8)$$

where M is the target sampling volume and N is the measured sampling volume and where both correspond to the kth sampling window. As another alternative for dynamically updating z, the service provider can utilize the following:

$$z_{k+1} = z_k(\hat{N}-\hat{R})/(M-\hat{R}) \qquad (9)$$

where M is the target sampling volume, $\hat{N}$ is the measured sampling volume, and $\hat{R}$ is the measured sampling volume for objects having a size greater than $z_k$, and where all correspond to the kth sampling window. (In the disclosure, "sampling window" is defined as being an interval during which objects are presented for sampling. The interval may be measured in time, e.g., in online applications where each object occurs at some time during the window. In offline applications, the objects have already been collected, and are then sampled offline. In this case, the interval might be measured in time, i.e. objects collected in a particular time window are presented for sampling, or in number where a certain number of objects are presented for sampling. The endpoint of the window may be determined prior to sampling, or it may depend on the objects, e.g. through the number that are sampled and/or their sizes.)

Figure 8:
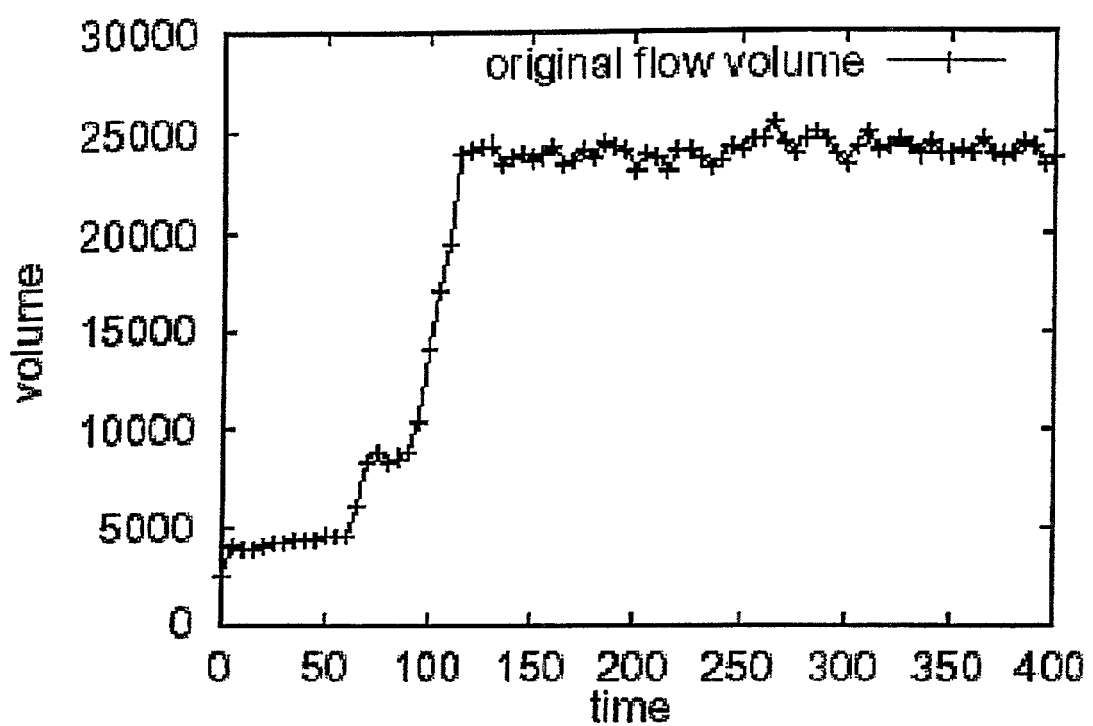
FIG. 8 shows an example of traffic flow volumes in a data network.
Figure 9:
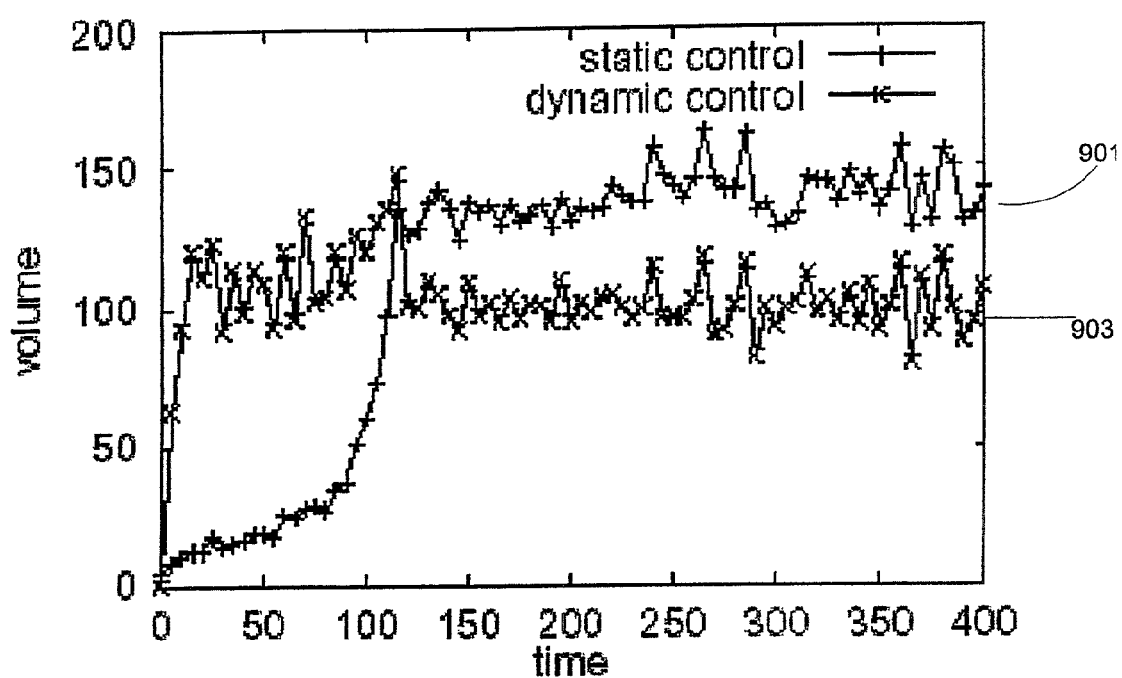
FIG. 9 shows static and dynamic controlled sampling volumes in relation to FIG. 8.

FIG. 8 shows an example of traffic flow volumes in data network 100. At approximately 100 seconds, data network 100 incurs a sudden increase of the traffic volume. FIG. 9 shows static (curve 901) and dynamic controlled (curve 903) sampling volumes in relation to FIG. 8. By adjusting threshold z, the sampling volume remains substantially constant relative to the sampling volume corresponding to a fixed threshold z.

If the arrival rate of objects to be sampled grows noticeably over a time scale shorter than the time duration (window width) of a sampling window, the exemplary embodiment enables the service provider to execute immediate corrective measures. The measured sampling volume $\hat{N}$ may significantly exceed the target M before the end of the sampling window. In the exemplary embodiment, if a target sample volume is already exceeded before the end of a window, the service provider should immediately change the threshold z. In this context, the windowing mechanism is a timeout that takes effect if N has not exceeded M by the end of the window. There are several variations of the exemplary embodiment. The corresponding emergency control can use timing information. If N already exceeds M at time t from a start of a window of length T, z is immediately replace by zT/t. Furthermore, if data network 100 provides control over the window boundaries, the a new sampling window can be started at that time. Otherwise, from time t one can reaccumulate the sample count N from zero, and the test and remedy procedure is repeated as needed for the remainder of the sampling window.

The target sampling volume M can be reduced to compensate for sampling variability. With a target sampling volume M, one can expect a relative error on N of about $1/\sqrt{M}$. In order to guard against statistical fluctuations of up to s standard deviations from a target sampling volume M, the target sampling volume can be adjusted by:

$$M_s = M - s\sqrt{M} \qquad (10)$$

where $M_s$ is the compensated target sampling volume.

Figure 10:
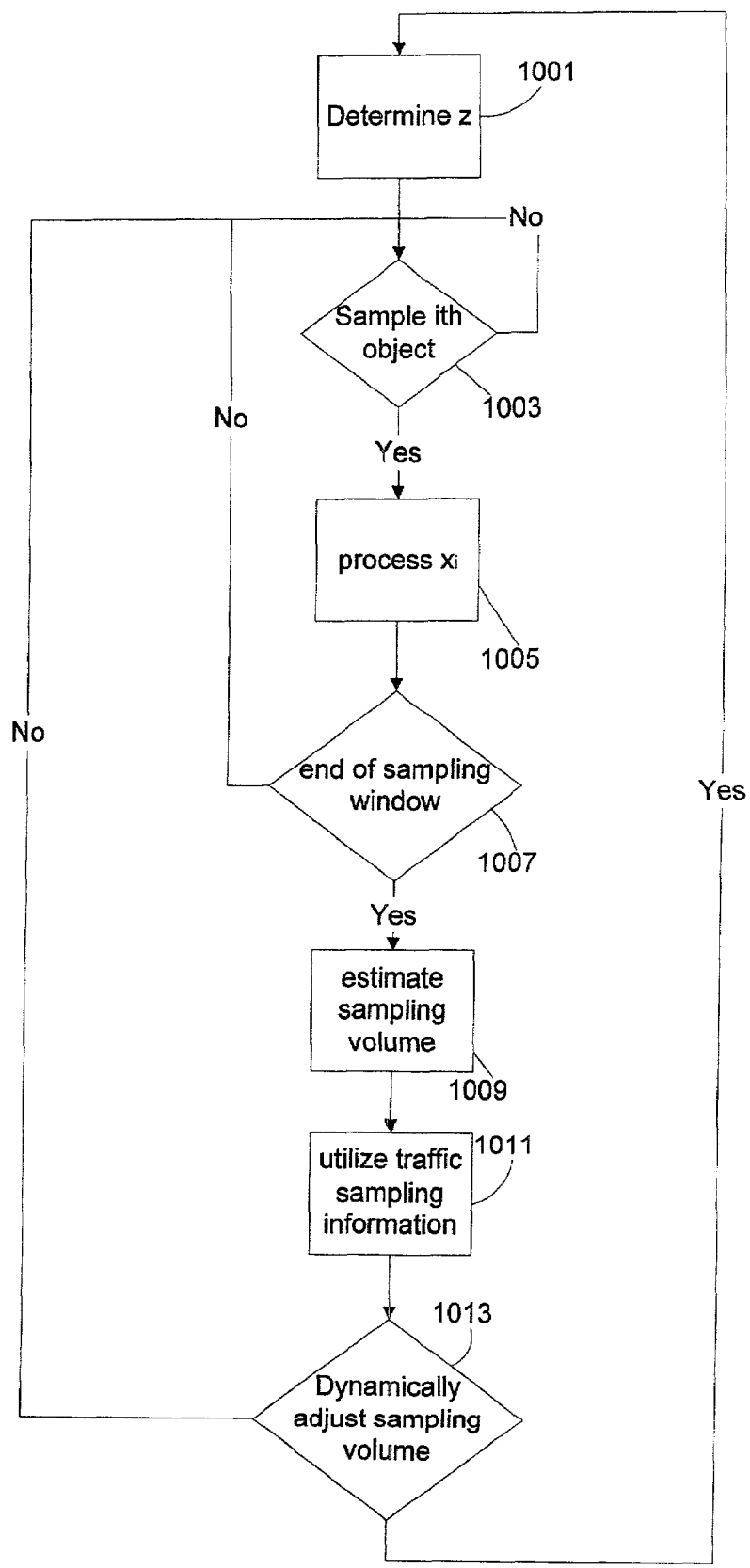
FIG. 10 is a flow diagram for controlling the sampling volume in a data network.

FIG. 10 is a flow diagram for controlling the sampling volume in data network 100. The value of z is determined in accordance with a targeted sample volume. (FIG. 12 provides a method for determining z.) In step 1003, it is determined whether to sample the ith object having a size $x_i$. (FIG. 11 provides a method for determining whether to sample the ith object.) If the object is sampled, then the corresponding traffic volume is estimated by normalizing $x_i$ by $p_z(x_i)$ and accumulated to the estimated traffic volume in step 1005. At the end of the sampling window as determined by step 1007, the sampling volume is estimated in step 1009 for data network 100. If the sampling window is not completed, then step 1003 is repeated. In step 1011, the estimated sampling volume is utilized by the service provider in maintaining data network 100. There are a spectrum of associated activities, including traffic engineering studies, network planning, peering policy, customer acquisition, marketing, and network security. As part of the network planning activity, the service provider can reconfigure the data network to be better matched to the traffic volume.

FIG. 11 is a flow diagram for a quasi-random data sampling algorithm. The process shown in FIG. 11 can be utilized by step 703 or by step 1003 in determining whether to sample an object (flow). In the exemplary embodiment as shown in FIG. 11, it is assumed that the variable "count" has a uniformly distributed value between 0 and z−1. In step 1101, count is reset to zero. In step 1103, the size of the object $x_i$ is compared to z. If $x_i$ is greater or equal to z, then the ith object is sampled in sample 1105. The index i is incremented by 1 in step 1107 so that the next object is considered in the next execution of step 1103. However, if $x_i$ is less than z in step 1103, then count is incremented by $x_i$ in step 1109. If count is greater than or equal to z in step 1111, count is decremented by z in step 1113 and the ith object is sampled in step 1115. However, if count is less than z in step 1111, index i is incremented by 1 in step 1107 so that the next object is considered for the next execution of step 1103.

FIG. 11 is one embodiment of a quasi-random data sampling algorithm. One skilled in the art appreciates that other quasi-random embodiments can be utilized in order to determine whether to sample an object.

FIG. 12 is a flow diagram for root finding algorithm that may be utilized in determining or updating z in step 701 (FIG. 7) or step 1001 (FIG. 10). Discussion of FIG. 12 is facilitated with specific notations as follow.

{X} is a set {$x_i$}, where each $x_i$ is the size of the ith object

{X|condition} is a subset of {X}, where each member satisfies the given condition

|X| is a number that is equal to the number of members in the set {X} sum {Y} is a number equal to the sum of the members of {Y}

The approach of the process shown in FIG. 12 is to select a candidate z and to determine if the candidate z is satisfactory, too large, or too small. The process utilizes a collection of numbers corresponding to the sizes of previously sampled objects and the target sampling volume M. However, the process as illustrated in FIG. 12 does not change the value of M. Rather, variables M, B, and C are internal variables that are used for calculations. The process only returns the appropriate value of z in steps 1205 and 1219.

In step 1201, M and {X} are inputted. Internal variable B is reset to zero. In step 1203, the number of members in {X} is compared to zero. If so, z=B/M is returned in step 1205 and the routine is exited. In step 1209, z is randomly selected from {X}. An efficient implementation may require that z be picked randomly from {X} so that the expectation is somewhere in the middle with respect to size. However, assuming that the order of the members from {X} is independent of size, one can let z be equal to the first member in {X}. In step 1211, set {Y} consists of the members of {X} whose values are less than z. In step 1213, C=sum{Y}, where C is an internal variable that is used for calculations. In step 1215, N=(B+C)/z+|X|−|Y|. |X| and |Y| are equal to the number of elements contained in {X} and {Y}, respectively. In step 1217, N is compared to M. If so, z is equal to $x_i$ that was selected in step 1209. If N is not equal to M, then step 1221 determines if N is greater than M. If so, {X}={X|x>z} in step 1223. In other words, members of set {X} are removed from the set whose values that are smaller or equal to z. Also, B=B+sum {X|x<=z}. In other words, B is incremented by the sum of the members that are removed from the set {X}. Step 1203 is then repeated. If step 1221 determines that N is not greater than M, then N is less than M. In that case, step 1225 is executed. In step 1225, set {X} is equal to set {Y}, where {Y} consists of the members of the previous set {X} that are less than z (as determined by step 1211). Also, M=M−(|X|−|Y|). In other words, M is reduced by |X|−|Y|. Step 1203 is then repeated.

Figure 13:
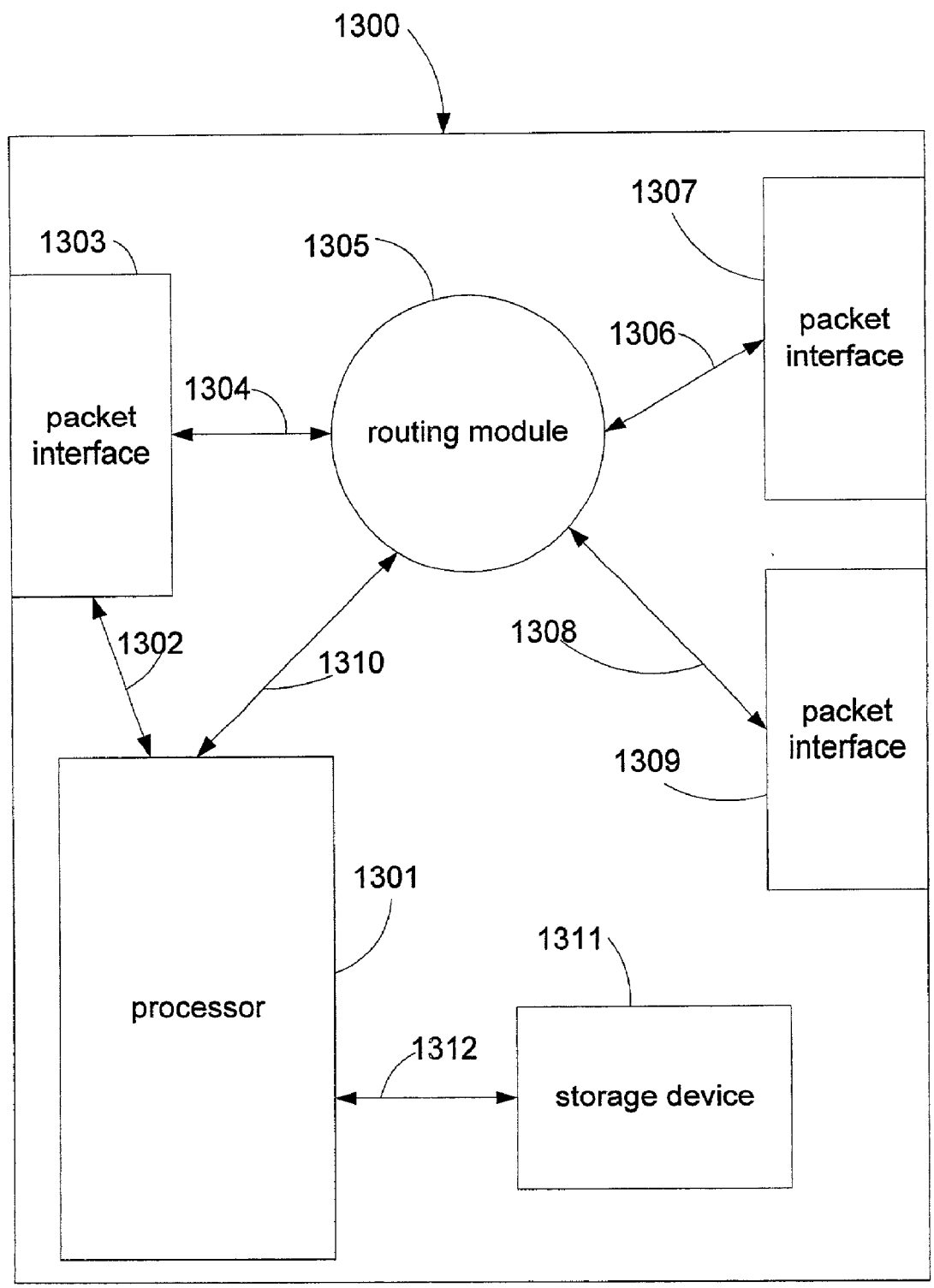
FIG. 13 shows an apparatus for managing a data network in accordance with the present invention.

FIG. 13 shows an apparatus 1300 for managing a data network in accordance with the present invention. Apparatus 1300 receives and sends packets that are transported by a data network through packet interface 1303. Processor 1301 receives packets containing traffic information through link 1302 from packet interface 1303. In a variation of the embodiment, apparatus 1300 provides router functionality with routing module 1305. Routing module 1305 directs packets between packet interface 1303 and packet interface 1307 through links 1304 and 1306 and between packet interface 1303 and packet interface 1309 through links 1304 and 1308. Processor 1301 configures routing module 1305 through link 1310 in accordance with the traffic information that is received through link 1302. Processor 1301 executes computer instructions corresponding to the flow diagrams shown in FIGS. 7, 10, 11, and 12.

In another variation of the embodiment, processor 1301 stores traffic information (that is received through link 1302) to storage device 1311 through link 1312 for later retrieval (e.g. billing information for charging a customer).

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

It is to be understood that the above-described embodiment is merely an illustrative principle of the invention and that many variations may be devised by those skilled in the art without departing from the scope of the invention. It is, therefore, intended that such variations be included with the scope of the claims.

We claim:

1. A method for managing a data network containing a data Interface and a processor connected to the data interface in order to receive objects, the objects containing traffic information, the method comprising:
   (a) receiving an object, wherein the object Is characterized by at least one attribute and wherein the object comprises at least one data element;
   (b) determining whether to sample the object in accordance with a probabilistic parameter
   (c) sampling the object in response to step (b); and
   (d) processing the sample in response to step (c).

2. The apparatus method of claim 1, wherein the probabilistic parameter is determined from a cost function.

3. The method of claim 2, wherein the cost function relates a network resource to a quality of measurements.

4. The apparatus method of claim 3, wherein the network resource corresponds to a sampling volume and the quality of measurements corresponds to a sampling accuracy.

5. The method of claim 1, wherein step (d) comprises:
   aggregating a plurality of samples in accordance with the at least one attribute.

6. The method of claim 1, wherein step (b) utilizes one of the at least one attribute to determine whether to sample the object.

7. The method of claim 6, wherein the one of the at least one attribute comprises a size of the object, wherein the size includes a contribution of the at least one data element.

8. The method of claim 7, wherein step (d) comprises:
   normalizing the size of the object.

9. The method of claim 6, wherein the object comprises at least one data element, wherein the data element is selected from the group consisting of an octet, an Internet Protocol (IP) packet, a frame relay packet, and an Asynchronous Transfer Mode (ATM) cell.

10. The method of claim 1, further comprising the steps of:
    (e) determining a measured usage of the data network in accordance with the at least one attribute; and
    (f) charging a customer for the measured usage in accordance with a charging function, wherein the customer is associated with the at least one attribute and wherein the customer is presented a bill for a billing period and wherein a charging accuracy is related to the charging function and an accuracy of the measured usage.

11. The method of claim 10, further comprising the step of:
    (g) adjusting the measured usage in order to control possible overcharging to the customer.

12. The method of claim 10, wherein step (f) utilizes a minimum usage and a usage charge.

13. The apparatus method of claim 12, wherein step (f) further utilizes a fixed charge.

14. The method of claim 10, further comprising the step of:
    (g) adjusting the probabilistic parameter in order to achieve a predetermined degree of accuracy of charging the customer, wherein a sampling volume is related to the probabilistic parameter.

15. The method of claim 10, further comprising the step of:
    (g) adjusting the probabilistic parameter in order to reduce unbillable usage within a predetermined percentage of the measured usage, wherein a sampling volume is related to the probabilistic parameter.

16. The method of claim 10, further comprising the step of:
(g) adjusting the billing period In order to control a degree of accuracy for charging the customer.

17. The method of claim 14, wherein the probabilistic parameter is adjusted.

18. The method of claim 15, wherein the probabilistic parameter is adjusted.

19. The apparatus method of claim 16, wherein the probabilistic parameter is adjusted.

20. The apparatus method of claim 1, further comprising the steps of:
(e) obtaining at least one sample from step (d); and
(f) calculating an estimated sampling volume from step (e).

21. The method of claim 20, further comprising the step of:
(g) storing the estimated sampling volume.

22. The method of claim 20, further comprising the step of:
(g) reconfiguring the data network in accordance with the estimated sampling volume.

23. The apparatus method of claim 20, further comprising the step of:
(g) adjusting the probabilistic parameter in order that the measured sampling volume approximates a targeted sampling volume.

24. The method of claim 23, wherein step (g) comprises:
updating a value of the probabilistic parameter corresponding to a sampling window.

25. The method of claim 24, wherein a current value of the probabilistic parameter equals a previous value of the probabilistic parameter multiplied by N divided by M, wherein N equals the measured sampling volume and M equals to the targeted sampling volume and wherein the previous value corresponds to a previous sampling window.

26. The method of claim 24, wherein a current value of the probabilistic parameter equals a previous value of the probabilistic parameter multiplied by (N-R) divided by (M-R) if M is greater than N and multiplied by N/M if N is greater than M, wherein N equals the measured sampling volume, M equals the targeted sampling volume, and R equals the sampling volume for objects having a size greater than the previous value of the probabilistic parameter.

27. The method of claim 24, wherein a current value of the probabilistic parameter is determined by a set of numbers end a target sampling volume, wherein each number corresponds to a size of a sampled object that was sampled In a previous sampling window.

28. The method of claim 24, further comprising the steps of:
(h) immediately updating a value of the probabilistic parameter when the measured sampling volume is greater than the targeted sampling volume in proportion to a measurement time duration, wherein the measurement time duration is less than the sampling window.

29. The method of claim 28, further comprising the step of:
(i) realigning the sampling window in accordance with the step of updating the value of the probabilistic parameter.

30. The method of claim 25, further comprising the step of:
(h) adjusting the measured sampling volume in accordance with a variance of the measured sampling volume.

31. The method of claim 26, further comprising the step of:
(h) adjusting the measured sampling volume in accordance with a variance of the measured sampling volume.

32. The method of claim 27, further comprising the stop of:
(h) adjusting the measured sampling volume in accordance with a variance of the measured sampling volume.

33. The apparatus method of claim 1, wherein step (c) utilizes a quasi-random data sampling algorithm.

34. The method of claim 7, wherein the probabilistic parameter is associated with a probability function that is characterized by a value equal to zero when the size of the object is zero, a linearly increasing value when the size Is between zero and the probabilistic parameter, and equal to one when the size is greater than the probabilistic parameter.

35. The method of claim 10, wherein the charging function comprises a fixed charge and a usage charge, wherein the usage charge is determined from a charge per unit of data, a minimum usage, and the measured usage.

36. The method of claim 1, wherein the probabilistic parameter corresponds to a first color and a second probabilistic parameter corresponds to a second color, wherein each color is associated with the at least one attribute.

37. A method for charging a customer for usage of a data network containing a data interface and a processor connected to the data interface in order to receive objects, the objects containing traffic information, the method comprising:
(a) adjusting a probabilistic parameter in accordance with a charging accuracy;
(b) receiving an object, wherein the object Is characterized by a size and a customer;
(c) determining whether to sample the object in accordance with the probabilistic parameter, wherein the probabilistic parameter approximately optimizes a cost function and wherein the cost function relates the probabilistic parameter to a sampling accuracy and a sampling volume;
(d) sampling the object in response to step (c);
(e) normalizing the sample in response to step (d);
(f) determining the usage for the customer in accordance with step (e);
(g) adjusting the usage in accordance with the charging accuracy; and
(h) determining a charge to the customer in response to step (g).

38. A method for managing a data network in accordance with a data volume, wherein the data network contains a data interface and a processor connected to the data interface in order to receive objects, the method comprising:
(a) adjusting a probabilistic parameter for a sampling window in accordance With a targeted sampling volume;
(b) receiving an object, wherein the object is characterized by a size;
(c) determining whether to sample the object in accordance with the probabilistic parameter, wherein the probabilistic parameter approximately optimizes a cost function, wherein the cost function relates the probabilistic parameter to a sampling accuracy and a sampling volume;

(d) sampling the object in response to step (C);
(e) normalizing the sample in response to step (d);
(f) determining an estimated traffic volume in accordance with step (e); and
(g) utilizing the estimated traffic volume to manage the data network.

39. A computer-readable medium containing instructions for controlling a computer system to manage a data network, by:
   receiving an object, wherein the object is characterized by at least one attribute and wherein the object comprises at least one data element;
   determining whether to sample the object in accordance with a probabilistic parameter;
   sampling the object in response to determining whether to sample the object; and
   processing the sample in response to sampling the object.

40. The computer-readable medium of claim 39, further containing instructions for controlling the computer system to manage the data network, by:
   determining a measured usage of the data network in accordance with the at least one attribute; and
   charging a customer for the measured usage in accordance with a charging function, wherein the customer is associated with the at least one attribute and wherein the customer is presented a bill for a billing period and wherein a charging accuracy is related to the charging function and an accuracy of the measured usage.

41. The computer-readable medium of claim 40, further containing instructions for controlling the computer system to manage the data network, by:
   adjusting the measured usage in order to control possible overcharging to the customer.

42. The computer-readable medium of claim 40, further containing instructions for controlling the computer system to manage the data network, by:
   adjusting the probabilistic parameter In order to reduce unbillable usage within a predetermined percentage of the measured usage, wherein a sampling volume is related to the probabilistic parameter.

43. The computer-readable medium of claim 40, further containing instructions for controlling the computer system to manage the data network, by:
   adjusting the billing period in order to control a degree of accuracy for charging the customer.

44. The computer-readable medium of claim 39, further containing instructions for controlling the computer system to manage the data network, by:
   obtaining at least one sample; and
   calculating an estimated sampling volume.

* * * * *